(12) United States Patent
Molchan et al.

(10) Patent No.: US 7,724,276 B2
(45) Date of Patent: May 25, 2010

(54) OPTICAL ASSEMBLY LOCK/UNLOCK APPARATUS AND METHOD

(75) Inventors: Erika Molchan, Meridian, ID (US); Rich Young, Kuna, ID (US); Elias Garcia, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1968 days.

(21) Appl. No.: 10/700,834

(22) Filed: Nov. 3, 2003

(65) Prior Publication Data
US 2005/0094217 A1 May 5, 2005

(51) Int. Cl.
*B41J 2/435* (2006.01)
(52) U.S. Cl. ....................................... 347/263
(58) Field of Classification Search .................. 347/138, 347/152, 242, 245, 257, 263; 399/144, 214; 358/474; 359/872, 896
See application file for complete search history.

(56) References Cited

U.S. PATENT DOCUMENTS

| | | | |
|---|---|---|---|
| 1,677,210 A | 7/1928 | Rose | |
| 2,963,546 A | 12/1960 | Hodne | |
| 4,773,773 A | 9/1988 | Itoh | |
| 5,114,252 A | 5/1992 | Tanuma et al. | |
| 5,119,212 A | 6/1992 | Mori et al. | |
| 5,751,431 A | 5/1998 | Taka et al. | |
| 5,767,977 A | 6/1998 | Thelen et al. | |
| 5,769,515 A | 6/1998 | Chang | |
| 5,803,622 A | 9/1998 | Mama et al. | |
| 5,973,866 A | 10/1999 | Tseng | |
| 6,010,204 A | 1/2000 | Morioka et al. | |
| 6,247,374 B1 | 6/2001 | Tseng | |
| 6,529,294 B1 | 3/2003 | Chang | |
| 6,582,089 B2 * | 6/2003 | Chee | 359/872 |
| 6,700,717 B2 * | 3/2004 | Lee | 359/896 |
| 7,068,401 B2 * | 6/2006 | Johnson et al. | 358/474 |
| 7,133,145 B2 * | 11/2006 | White et al. | 358/1.14 |
| 7,268,922 B2 * | 9/2007 | Hsu | 358/474 |
| 2001/0010582 A1 | 8/2001 | Hayashi et al. | |
| 2001/0052914 A1 | 12/2001 | Lee | |
| 2002/0015070 A1 | 2/2002 | Taylor et al. | |
| 2002/0024553 A1 | 2/2002 | Nishioka et al. | |
| 2002/0148945 A1 | 10/2002 | Gilpin | |
| 2003/0231357 A1 | 12/2003 | Johnson | |

FOREIGN PATENT DOCUMENTS

| | | | |
|---|---|---|---|
| DE | 19810878 C1 | 8/1999 | |
| JP | 64001573 A | 1/1989 | |
| JP | 2068576 A | 3/1990 | |
| JP | 11027462 A | 1/1999 | |
| JP | 2002144673 A | * 5/2002 | |

* cited by examiner

*Primary Examiner*—Hai C Pham

(57) ABSTRACT

An optical assembly lock/unlock apparatus includes an interlock mechanism configured to selectively lock an optical assembly in a fixed position relative to a scan engine and unlock the optical assembly relative to the scan engine when the scan engine is to be removed from and secured to a print engine.

16 Claims, 5 Drawing Sheets

OPTICAL ASSEMBLY LOCK/UNLOCK APPARATUS AND METHOD

BACKGROUND

A digital image forming apparatus equipped with an optical scanner unit which is detachable from a main body typically includes in its upper part an image reading section, and in its lower part an image holding member and an image forming section. The image reading section outputs a document image in a form of an electric image signal using a line image sensor, etc. The image forming section develops an electrostatic latent image formed on an image holding member and transfers it onto a sheet, and also performs cleaning. The optical scanner unit is provided for forming an electrostatic latent image on a surface of a photoreceptor by scanning an optical image by projecting thereon a laser beam. The described optical scanner unit is provided between the image reading section and the image forming section in consideration of a space, image forming processes, etc.

The optical scanner unit and the image forming section including the image holding member, etc., are respectively composed of many members which are often subject to cleaning and exchange, etc., and for the described purposes, the optical scanner unit and the image forming section are often removed from the digital image forming apparatus.

BRIEF DESCRIPTION OF THE DRAWINGS

Detailed description of embodiments of the invention will be made with reference to the accompanying drawings.

DETAILED DESCRIPTION

The following is a detailed description for carrying out the invention. This description is not to be taken in a limiting sense.

Some embodiments of the present invention address the problem of optical assemblies breaking as a result of service personnel and/or customers forgetting to lock the optical assembly when removing the scan engine from the print engine for moving, shipping or servicing. Apparatuses and methods according to various embodiments of the present invention facilitate automatic locking of the optical assembly when the scan engine is separated from the print engine. By way of example, the locking/unlocking mechanisms according to some embodiments, are useful for multifunction printers (MFPs) and copiers that utilize separate scan and print engines. Apparatuses and methods that protect optical assemblies from damage caused by loss of power to the device are also described herein.

Figure 1A:
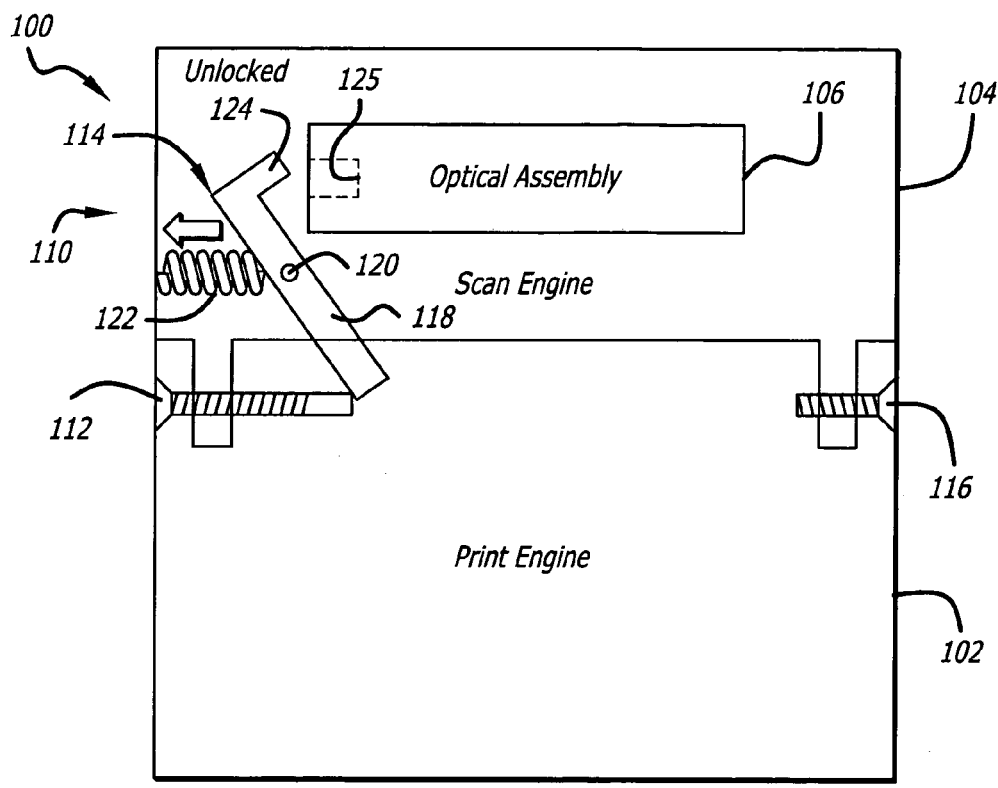
FIG. 1A is a cross-sectional side view of an optical assembly lock/unlock apparatus according to an example embodiment of the present invention, the optical assembly lock/unlock apparatus being shown in its optical unit unlocked position.
Figure 1B:
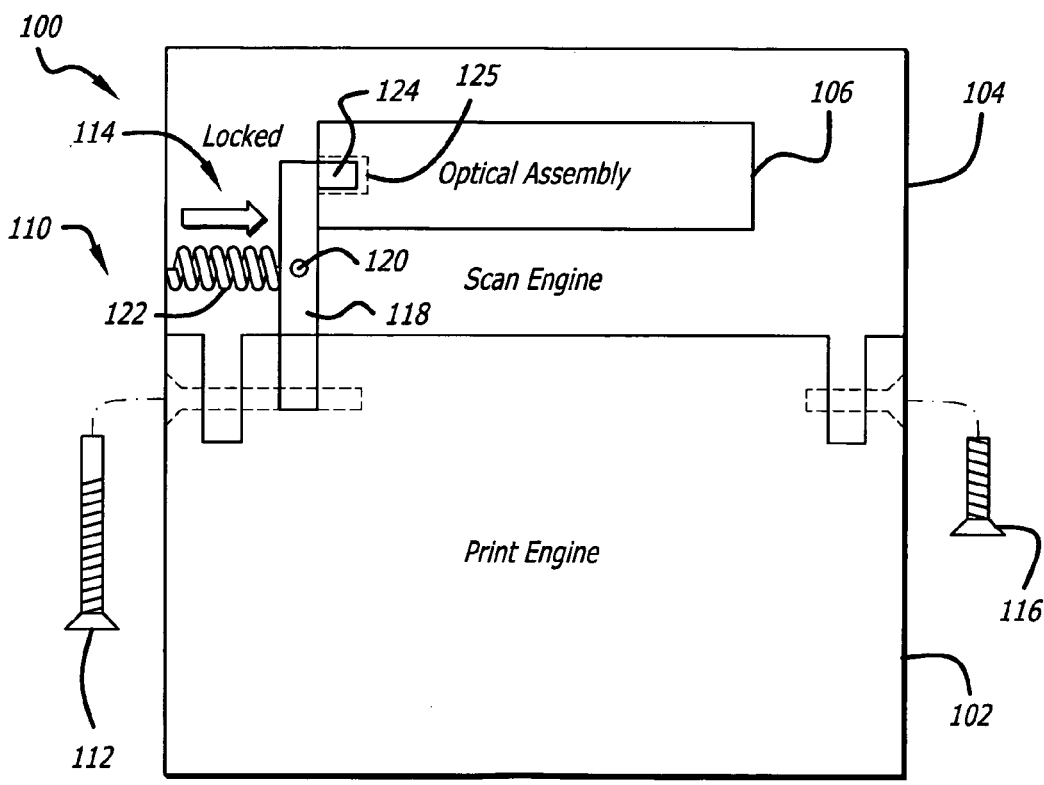
FIG. 1B is a cross-sectional side view of the optical assembly lock/unlock apparatus of FIG. 1A, the optical assembly lock/unlock apparatus being shown in its optical unit locked position.

Referring to FIGS. 1A and 1B, a digital image forming apparatus 100 includes a print engine 102 and a scan engine 104 with an optical assembly 106. The print engine 102 develops an electrostatic latent image formed on an image holding member and transfers it onto a print medium. The scan engine 104 forms the electrostatic latent image on a surface of a photoreceptor using the optical assembly 106 which scans an optical image, e.g., by projecting a laser beam thereon. In this illustrated example embodiment of the present invention, the digital image forming apparatus 100 also includes an optical assembly lock/unlock apparatus 110 shown in its optical unit unlocked and locked positions, in FIGS. 1A and 1B, respectively. The print engine 102 may comprise any suitable print engine, such as an ink jet print engine, an electrostatic print engine, or the like.

The illustrated example optical assembly lock/unlock apparatus 110 includes a securing component 112 configured to secure the scan engine 104 to the print engine 102. The illustrated example optical assembly lock/unlock apparatus 110 also includes an interlock mechanism 114 configured to lock the optical assembly 106 in a fixed position relative to the scan engine 104 when the securing component 112 is removed (FIG. 1B) and to unlock the optical assembly 106 from the scan engine 104 when the scan engine 104 is secured to the print engine 102 by the securing component 112 (FIG. 1A). In operation, motion of the optical assembly 106 is imparted by micro-stepping motors or the like (not shown). As discussed below, the interlock mechanism 114 mechanically engages the optical assembly 106 to prevent such motion. The securing component 112 can be a bolt-shaped or threaded member such as a screw. It should be appreciated that the scope of the present invention is not limited to the securing components explicitly disclosed herein. For example, it is contemplated that the securing component 112 can take the form of any component or components (e.g., screws, bolts, hinges, etc.) that are removed, repositioned or otherwise manipulated during the process of separating the scan engine 104 from the print engine 102. In this illustrated example embodiment, an additional (optional) securing component 116 is configured as shown and functions to further secure the scan engine 104 to the print engine 102.

The illustrated example interlock mechanism 114 includes an engaging member 118 biased to engage the optical assembly 106 and is configured such that the securing component 112 applies a counterforce to the engaging member 118 that disengages the engaging member 118 from the optical assembly 106 when the scan engine 104 is secured to the print engine 102 by the securing component 112. In the illustrated example embodiment, a pivot member 120 pivotally secures the engaging member 118 to the scan engine 104 as shown.

The interlock mechanism 114 also includes a biasing mechanism for applying a force against the engaging member 118 to lock the optical assembly 106 of the scan engine 104 in position within the scan engine 104. In the illustrated example embodiment, the engaging member 118 is biased with a spring 122 and includes a cantilevered end portion 124 that engages the optical assembly 106 when the securing component 112 is removed (FIG. 1B). The optical assembly 106 includes a recessed portion 125 sized and configured as shown to receive the cantilevered end portion 124. It should be appreciated that the scope of the present invention is not limited to the interlock mechanisms explicitly disclosed herein. For example, it is contemplated that the interlock mechanism 114 can take the form of any component or components (e.g., pins, clamps, rods, etc.) that can be used to mechanically engage and lock the optical assembly 106 in place relative to the scan engine 104.

In various embodiments of the present invention, the interlock mechanism is entirely mechanically driven (i.e., not relying on electrical power) which allows the device to be turned off and/or unplugged before the process of removing the scan engine 104 begins. The interlock mechanism of this example embodiment, by virtue of its "auto lock" functionality, necessarily prevents an individual from failing to lock the optical assembly 106 before separating the scan engine 104 from the print engine 102. For desktop devices, this makes return to bench/express exchange repair strategies more feasible by minimizing the opportunities for shipping damage. For larger MFP devices, this makes them more successfully movable, allows for more service options, etc. Similarly, the "auto unlock" functionality of the interlock mechanism lessens the potential for damaging the optical assembly 106 and reduces the likelihood of customer confusion by having a visible, manual interlock mechanism. This, in turn, potentially reduces the number of customer calls, lowers warranty costs, etc.

Thus, according to an embodiment of the present invention, a method for locking an optical assembly includes: removing a component that mechanically couples a scan engine including an optical assembly to a print engine; allowing a biased engaging member to lock the optical assembly in a fixed position relative to the scan engine in response to the moving. In various embodiments of the present invention, the mechanical interlock locks the scan engine optical assembly in place when a certain component for removing the scan engine from the print engine (e.g., a screw, bolt, hinge, etc.) is removed.

According to another embodiment of the present invention, a method for unlocking an optical assembly includes: installing a component that mechanically couples a scan engine including an optical assembly to a print engine; counterbiasing a biased engaging member with the component to unlock the optical assembly from the scan engine. Thus, with reference to the example embodiment shown in FIGS. 1A and 1B, in addition to securing the scan engine 104 to the print engine 102, the securing component 112 provides a counterforce against the engaging member 118 (i.e., in opposition to the force applied by the spring 122) that unlocks the optical assembly 106 when the scan engine 104 is secured to the print engine 102.

Figure 2A:
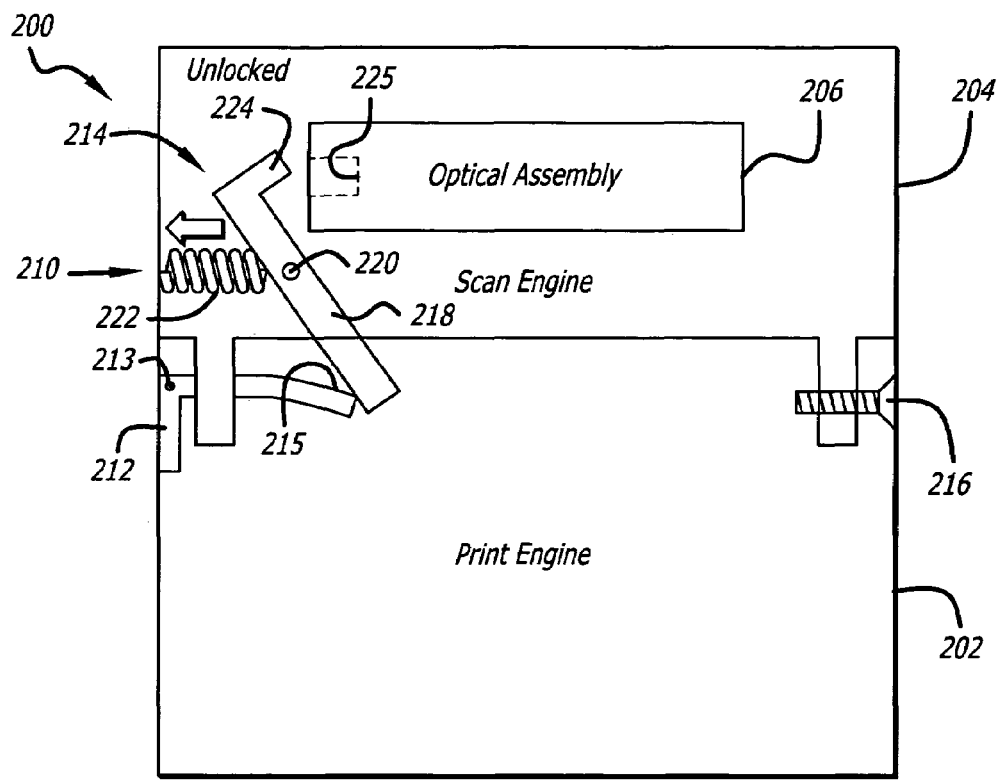
FIG. 2A is a cross-sectional side view of an optical assembly lock/unlock apparatus according to another example embodiment of the present invention, the optical assembly lock/unlock apparatus being shown in its optical unit unlocked position.
Figure 2B:
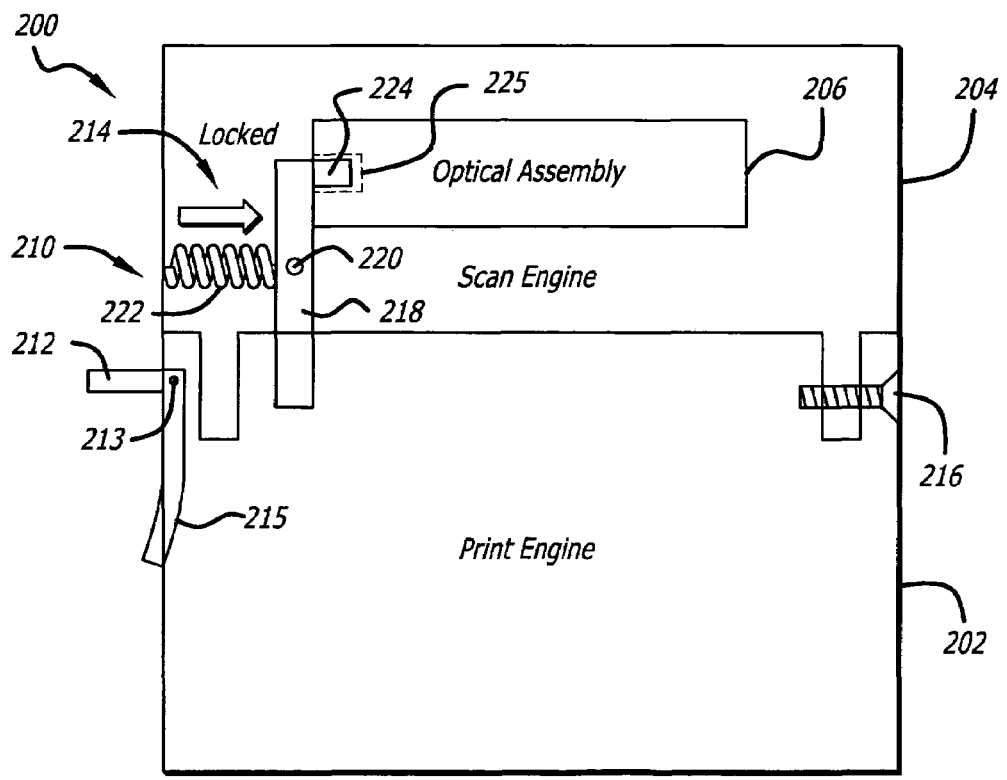
FIG. 2B is a cross-sectional side view of the optical assembly lock/unlock apparatus of FIG. 2A, the optical assembly lock/unlock apparatus being shown in its optical unit locked position.

Referring to FIGS. 2A and 2B, a digital image forming apparatus 200 includes a print engine 202 and a scan engine 204 with an optical assembly 206. The print engine 202 develops an electrostatic latent image formed on an image holding member and transfers it onto a print medium. The scan engine 204 forms the electrostatic latent image on a surface of a photoreceptor using the optical assembly 206 which scans an optical image, e.g., by projecting a laser beam thereon. In this illustrated example embodiment of the present invention, the digital image forming apparatus 200 also includes an optical assembly lock/unlock apparatus 210 shown in its optical unit unlocked and locked positions, in FIGS. 2A and 2B, respectively.

The illustrated example optical assembly lock/unlock apparatus 210 includes a latch 212 mechanically coupled to a print engine 202. The illustrated example optical assembly lock/unlock apparatus 210 also includes an interlock 214 mechanically coupled to the scan engine 204 which is detachably secured to the print engine 202. The interlock 214 is configured to lock the optical assembly 206 in a fixed position relative to the scan engine 204 when the latch 212 is in a first position (FIG. 2B) and to unlock the optical assembly 206 from the scan engine 204 when the latch 212 is in a second position (FIG. 2A). In this illustrated example embodiment, the first position is an opened position and the second position is a closed position. In this illustrated example embodiment, a pivot member 213 pivotally secures the latch 212 to the print engine 202 as shown. The example latch 212 includes a (curved) contact surface 215 that contacts the interlock 214 when the latch 212 is in the second position. However, it should be appreciated that different latch structures and configurations are also contemplated as being within the scope of the present invention.

The illustrated example optical assembly lock/unlock apparatus 210 also includes a securing component 216 which is configured as shown and functions to secure the scan engine 204 to the print engine 202. In another embodiment, the latch 212 is configured to additionally perform the function of securing the scan engine 204 to the print engine 202 when in its closed position as shown in FIG. 2A.

The illustrated example interlock mechanism 214 includes an engaging member 218 biased to engage the optical assembly 206 and is configured such that the latch 212 applies a counterforce to the engaging member 218 that disengages the engaging member 218 from the optical assembly 206 when the latch 212 is in the second position (FIG. 2A). In the illustrated example embodiment, a pivot member 220 pivotally secures the engaging member 218 to the scan engine 204 as shown.

The interlock mechanism 214 also includes a biasing mechanism for applying a force against the engaging member 218 to lock the optical assembly 206 of the scan engine 204 in position within the scan engine 204. In the illustrated example embodiment, the engaging member 218 is biased with a spring 222 and includes a cantilevered end portion 224 that engages the optical assembly 206 when the latch 212 is in the first position (FIG. 2B). The optical assembly 206 includes a recessed portion 225 sized and configured as shown to receive the cantilevered end portion 224. As discussed with reference to the prior embodiment, it should be appreciated that the interlock mechanism 214 can take the form of any component or components (e.g., pins, clamps, rods, etc.) that can be used to mechanically engage and lock the optical assembly 206 in place relative to the scan engine 204.

Thus, the latch 212 can be viewed as a counterforce member (i.e., providing a counterforce against the force against the engaging member 218 by the spring 222). In operation, with reference to FIG. 2A, the counterforce member (latch 212) is moved breaking a point of contact between the counterforce member and the engaging member 218 such that a force exerted by the spring 222 (or other actuator) of the scan engine 204 is now sufficient to reposition the engaging member 218 to lock the optical assembly 206 in a fixed position within the scan engine 204. With reference to FIG. 2B, the counterforce member is repositioned relative to the print engine 202 such that the counterforce member applies a counterforce to the engaging member 218 that overcomes the force imparted by the spring 222 and repositions the engaging member 218 relative to the optical assembly 206 to unlock the optical assembly 206 within the scan engine 204.

Figure 3A:
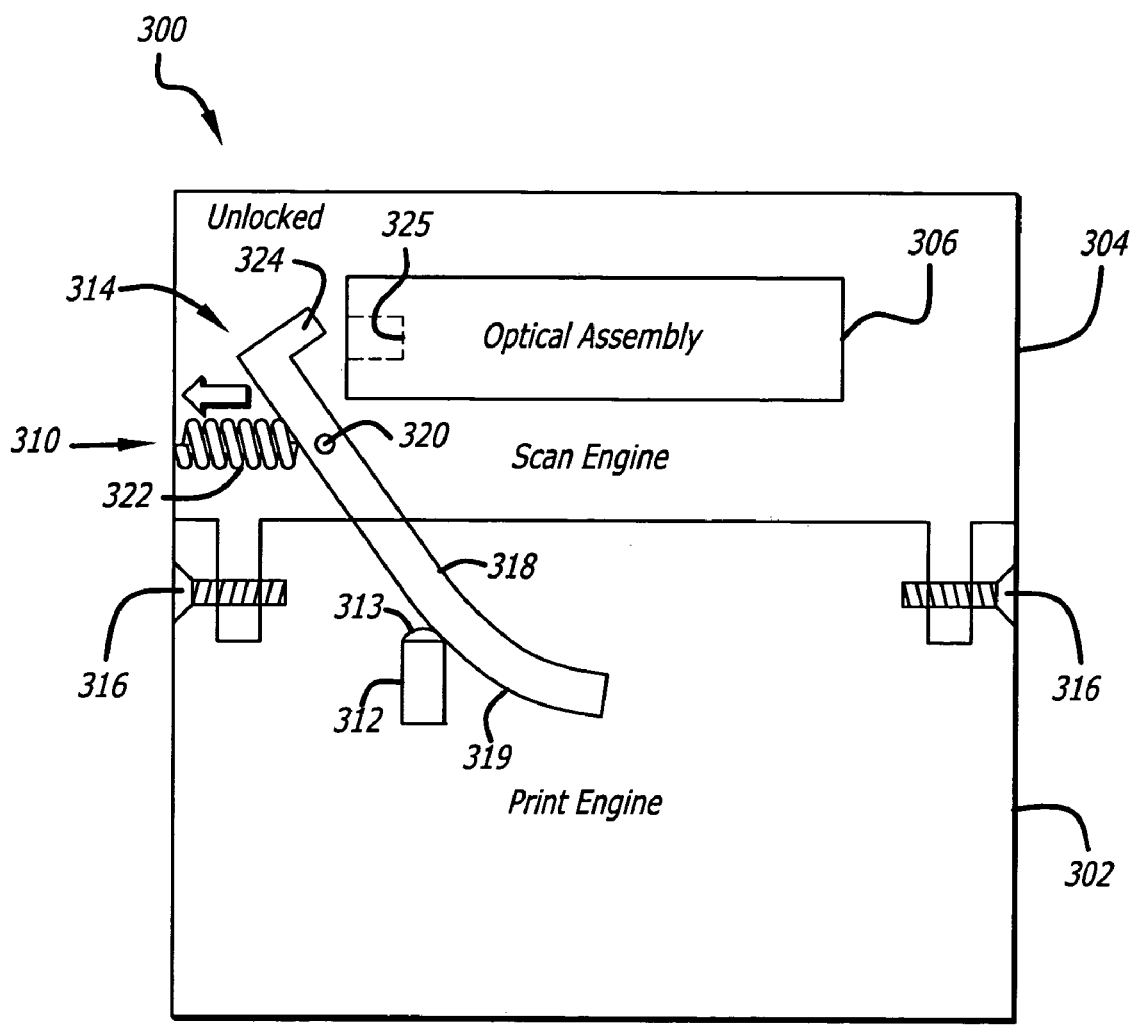
FIG. 3A is a cross-sectional side view of an optical assembly lock/unlock apparatus according to another example embodiment of the present invention, the optical assembly lock/unlock apparatus being shown in its optical unit unlocked position.
Figure 3B:
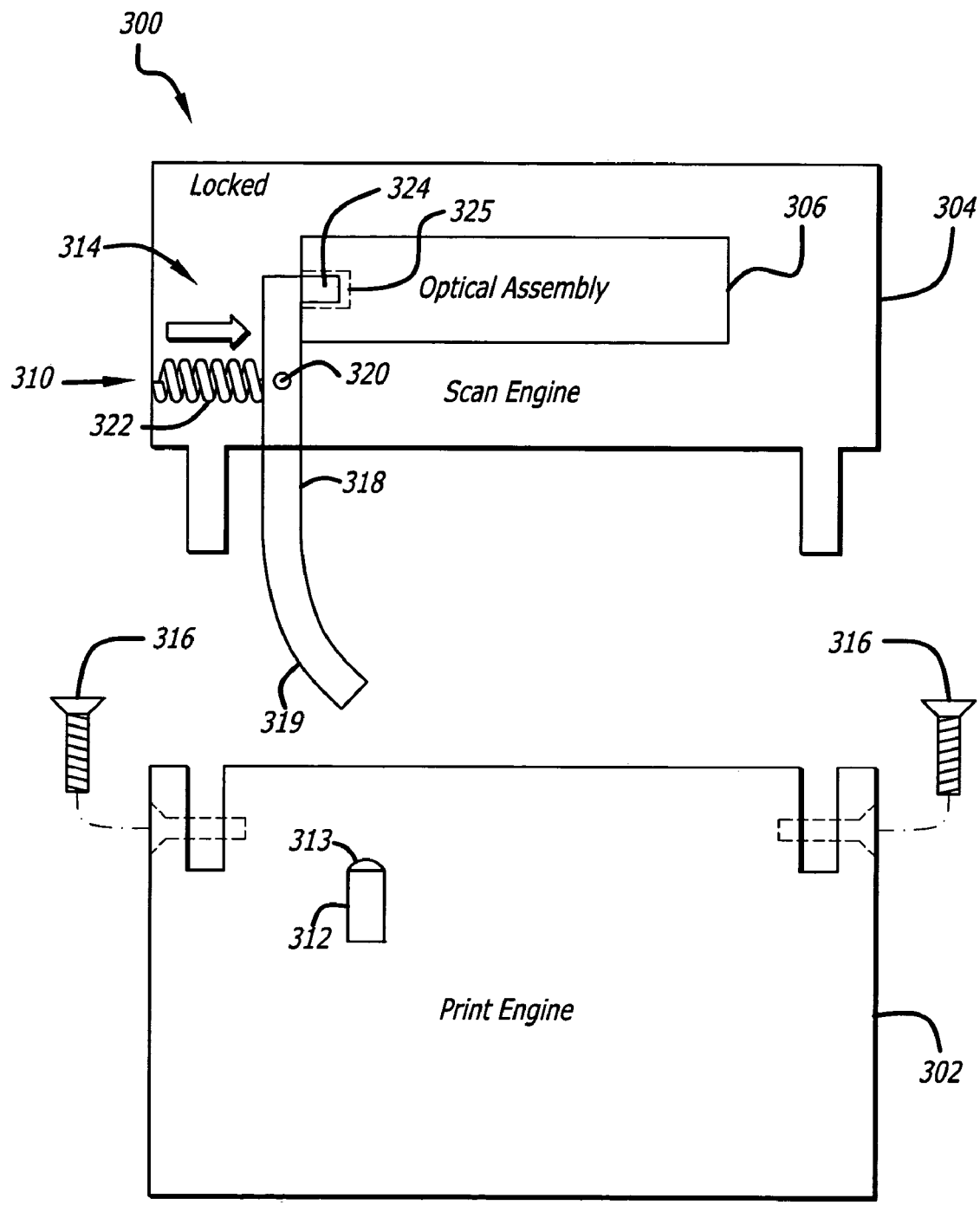
FIG. 3B is a cross-sectional side view of the optical assembly lock/unlock apparatus of FIG. 3A, the optical assembly lock/unlock apparatus being shown in its optical unit locked position.

Referring to FIGS. 3A and 3B, a digital image forming apparatus 300 includes a print engine 302 and a scan engine 304 with an optical assembly 306. The print engine 302 develops an electrostatic latent image formed on an image holding member and transfers it onto a print medium. The scan engine 304 forms the electrostatic latent image on a surface of a photoreceptor using the optical assembly 306 which scans an optical image, e.g., by projecting a laser beam thereon. In this illustrated example embodiment of the present invention, the digital image forming apparatus 300 also includes an optical assembly lock/unlock apparatus 310 shown in its optical unit unlocked and locked positions, in FIGS. 3A and 3B, respectively.

The illustrated example optical assembly lock/unlock apparatus 310 includes a bearing member 312 mechanically coupled to the print engine 302, which is interconnectable with the scan engine 304. The illustrated example optical assembly lock/unlock apparatus 310 also includes an interlock 314 mechanically coupled to the scan engine 304. The interlock 314 is configured to lock the optical assembly 306 in a fixed position relative to the scan engine 304 when the scan engine 304 is separated from the print engine 302 (FIG. 3B) and to make contact with the bearing member 312 to unlock the optical assembly 306 from the scan engine 304 when the print engine 302 and the scan engine 304 are interconnected. In this illustrated example embodiment, the bearing member 312 is fixedly secured to the print engine 302 and includes a curved portion 313 configured as shown. The illustrated example optical assembly lock/unlock apparatus 310 also includes securing components 316 which are configured as shown and function to secure the scan engine 304 to the print engine 302. The securing components 316 can take the form of any suitable securing mechanism (e.g., screws, bolts, hinges, etc.).

The illustrated example interlock 314 includes an engaging member 318 biased to engage the optical assembly 306 and is configured such that the bearing member 312 applies a counterforce to the engaging member 318 that disengages the engaging member 318 from the optical assembly 306 when the print engine 302 and the scan engine 304 are interconnected. In the illustrated example embodiment, a pivot member 320 pivotally secures the engaging member 318 to the scan engine 304 as shown.

The interlock 314 also includes a biasing mechanism for applying a force against the engaging member 318 to lock the optical assembly 306 of the scan engine 304 in position within the scan engine 304. In the illustrated example embodiment, the engaging member 318 is biased with a spring 322 and includes a cantilevered end portion 324 that engages the optical assembly 306 when the scan engine 304 is separated from the print engine 302. The optical assembly 306 includes a recessed portion 325 sized and configured as shown to receive the cantilevered end portion 324. In the illustrated example embodiment, the engaging member 318 includes a curved surface 319 that makes contact with the bearing member 312 as the print engine 302 and the scan engine 304 are interconnected. As shown in FIG. 3A, the curved surface 319 makes contact with the curved portion 313 of the bearing member 312 counterbiasing the engaging member 318 (against the bias imparted by the spring 322) to unlock the optical assembly 306. Conversely, as shown in FIG. 3B, after the securing components 316 are removed, the act of separating the scan engine 304 from the print engine 302 raises the engaging member 318 relative to the bearing member 312 causing the point of contact between the curved surface 319 and the curved portion 313 to move further away from the cantilevered end portion 324 of the engaging member 318, which eventually allows the bias imparted by the spring 322 to push the cantilevered end portion 324 into a position where the cantilevered end portion 324 locks the optical assembly 306. As with the previously discussed embodiments, it should be appreciated that different interlock structures and configurations are also contemplated as being within the scope of the present invention. In some embodiments, the portion 313 and the surface 319 may have shapes other than curved.

Thus, according to an embodiment of the present invention, a method for locking an optical assembly includes: removing a component that mechanically couples a scan engine including an optical assembly to a print engine; and separating the scan engine from the print engine to allow a biased engaging member to lock the optical assembly in a fixed position relative to the scan engine. In some embodiments, the step of removing the component may be optional.

According to another embodiment of the present invention, a method for unlocking an optical assembly includes: mounting a scan engine including an optical assembly to a print engine; applying a counterbias to a biased engaging member to unlock the optical assembly from the scan engine by the mounting.

Figure 4:
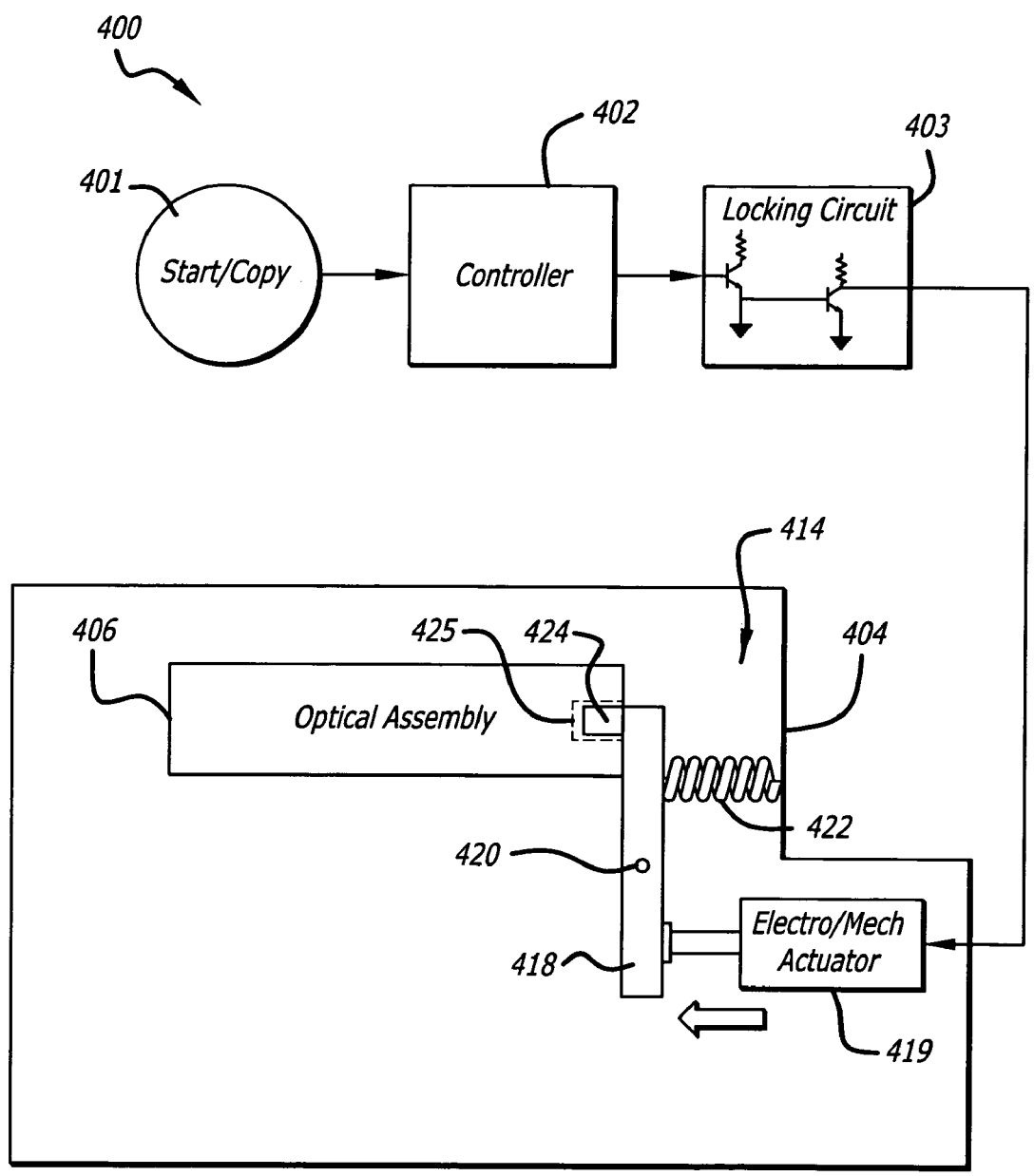
FIG. 4 is a diagram of an optical assembly lock/unlock apparatus according to another example embodiment of the present invention, the optical assembly lock/unlock apparatus being shown in its optical unit locked position.

Referring to FIG. 4, an optical assembly lock/unlock apparatus 400 is shown in its locked position, i.e., locking an optical assembly 406 which is part of a scan engine 404. The scan engine 404 forms the electrostatic latent image on a surface of a photoreceptor using the optical assembly 406 which scans an optical image, e.g., by projecting a laser beam thereon. In the illustrated example embodiment, the optical assembly lock/unlock apparatus 400 includes an interlock 414 which is mechanically coupled to the scan engine 404. In the illustrated example embodiment, the interlock 414 is configured (via an input signal 401, a controller 402, and a locking circuit 403) to lock the optical assembly 406 in a fixed position relative to the scan engine 404 when the scan engine 404 is not being used and to unlock the scan engine 404 when the scan engine 404 is to be used. In one embodiment, the interlock 414 is configured to lock the optical assembly 406 in a fixed position relative to the scan engine 404 when power is no longer provided to the scan engine 404.

The illustrated example interlock 414 includes an engaging member 418 biased to engage the optical assembly 406. The interlock 414 also includes a biasing mechanism for applying a force against the engaging member 418 to lock the optical assembly 406 of the scan engine 404 in position within the scan engine 404. In the illustrated example embodiment, the engaging member 418 is biased with a spring 422 and includes a cantilevered end portion 424 that engages the optical assembly 406. The optical assembly 406 includes a recessed portion 425 sized and configured as shown to receive the cantilevered end portion 424. The interlock 414 also includes an actuator 419 configured to counterbias the engaging member 418 to disengage from the optical assembly 406. In the illustrated example embodiment, a pivot member 420 pivotally secures the engaging member 418 to the scan engine 404 as shown. By way of example, when a start/copy function is initiated, this provides a signal to the controller 402 which, in turn, provides a control signal to the locking circuit 403. The actuator 419 (e.g., an electro/mechanical actuator) is controlled by the locking circuit 403 to an energized or activated state and remains in such a state until its control input is changed or until power is removed from the device. In either instance, the actuator 419 transitions to a de-energized or deactivated state and the force imparted by the spring 422 pushes the cantilevered end portion 424 into a position where the cantilevered end portion 424 locks the optical assembly 406. It should be appreciated that different control and/or interlock structures and configurations are also contemplated as being within the scope of the present invention. Moreover, the controller 402 and locking circuit 403 do not have to be separate circuits, and either or both can be included as part of the scan engine 404 or remotely located.

In operation, by way of example, the optical assembly 406 is always locked until the start/copy button is depressed. The controller 402 (e.g., a micro-controller) is configured to determine when to release the optical assembly 406 for start of scan and releases (unlocks) the optical assembly 406 by activating the actuator 419. Upon completion of the scan, the controller 402 generates an appropriate signal to cause the downstream circuitry and actuator mechanism to return the optical assembly 406 to its "default" locked state. Also, upon power loss to the device, the actuator 419 is deactivated by default. In some embodiments, the actuator 419 is configured to directly engage and lock the optical assembly 406, instead of the cantilevered end portion 424.

Thus, according to an embodiment of the present invention, the optical assembly is, in a default condition, "locked" (independent of whether power is applied) and released by a microprocessor-controlled actuator only for the duration of a scan operation and, thereafter, the optical assembly goes back to the default locked state. In other words, the unit is only unlocked during a scan and goes back into lock when not in use or when power is removed.

According to another embodiment of the present invention, a method for locking/unlocking an optical assembly includes: monitoring a state of use of a scan engine that includes an optical assembly; and locking or unlocking the optical assembly depending upon the state of use (e.g., such that the optical assembly is unlocked when the scan engine is to be used and locked at all other times).

According to another embodiment of the present invention, a method for locking/unlocking an optical assembly includes: biasing an engaging member to engage an optical assembly of a scan engine as a default state; and counterbiasing the engaging member to disengage the optical assembly from the scan engine when the scan engine is to be used.

Although the present invention has been described in terms of the example embodiments above, numerous modifications and/or additions to the above-described embodiments would be readily apparent to one skilled in the art. It is intended that the scope of the present invention extends to all such modifications and/or additions.

We claim:

1. An optical assembly lock/unlock apparatus comprising:
   a securing component configured to secure a scan engine to a print engine, the scan engine including an optical assembly; and
   an interlock mechanism acted on by the securing component and configured to lock the optical assembly in a fixed position and prevent motion of the optical assembly within the scan engine when the securing component is removed from interaction with the interlock mechanism, and to unlock the optical assembly and permit motion of the optical assembly within the scan engine when the scan engine is secured to the print engine by the securing component and the securing component interacts with the interlock mechanism.

2. The optical assembly lock/unlock apparatus of claim 1, wherein the securing component is a bolt-shaped member.

3. The optical assembly lock/unlock apparatus of claim 1, wherein the securing component is a threaded member.

4. The optical assembly lock/unlock apparatus of claim 1, wherein the securing component is a screw.

5. The optical assembly lock/unlock apparatus of claim 1, wherein the interlock mechanism includes an engaging member biased to engage the optical assembly and is configured such that the securing component applies a counterforce to the engaging member that disengages the engaging member from the optical assembly when the scan engine is secured to the print engine by the securing component.

6. The optical assembly lock/unlock apparatus of claim 5, wherein the engaging member includes a cantilevered end portion that engages the optical assembly when the securing component is removed.

7. The optical assembly lock/unlock apparatus of claim 5, wherein the engaging member is pivotally secured to the scan engine.

8. The optical assembly lock/unlock apparatus of claim 5, wherein the engaging member is biased with a spring.

9. A method for locking an optical assembly comprising:
   removing a component that mechanically couples a scan engine including an optical assembly to a print engine;
   removing interaction of the component with a biased engaging member and locking the optical assembly in a fixed position relative to the scan engine with the biased engaging member in response to the removing the component, the locking including preventing motion of the optical assembly within the scan engine.

10. The method for locking an optical assembly of claim 9, wherein the removing interaction of the component with the biased engaging member includes allowing a biasing mechanism to apply a force against the biased engaging member to lock the optical assembly in the fixed position.

11. The method for locking an optical assembly of claim 10, wherein the biasing mechanism comprises a spring.

12. The method for locking an optical assembly of claim 9, wherein the biased engaging member is pivotally secured to the scan engine, and wherein the removing interaction of the component with the biased engaging member includes pivoting an end of the biased engaging member into engagement with the optical assembly to lock the optical assembly in the fixed position.

13. A method for unlocking an optical assembly comprising:
   installing a component that mechanically couples a scan engine including an optical assembly to a print engine;
   establishing interaction of the component with a biased engaging member and unlocking the optical assembly from the scan engine with the biased engaging member in response to the installing the component, the unlocking including permitting motion of the optical assembly within the scan engine.

14. The method for unlocking an optical assembly of claim 13, wherein the establishing interaction of the component with the biased engaging member includes overcoming a force applied against the biased engaging member by a biasing mechanism to unlock the optical assembly.

15. The method for unlocking an optical assembly of claim 14, wherein the biasing mechanism comprises a spring.

16. The method for unlocking an optical assembly of claim 13, wherein the biased engaging member is pivotally secured to the scan engine, and wherein the establishing interaction of the component with the biased engaging member includes pivoting an end of the biased engaging member out of engagement with the optical assembly to unlock the optical assembly.

* * * * *